(12) United States Patent  (10) Patent No.: US 11,615,277 B2
Devlieghere et al.                (45) Date of Patent:     Mar. 28, 2023

(54) DIGITAL PRINTING METHOD AND SYSTEM USING CONTROL PATCHES

(71) Applicant: XEIKON MANUFACTURING N.V., Lier (BE)

(72) Inventors: Jurgen Nobert Bart Devlieghere, Borgerhout (BE); Romain Jan Victor Paul Van Der Gucht, Lint (BE)

(73) Assignee: XEIKON MANUFACTURING N.V., Lier (BE)

( * ) Notice: Subject to any disclaimer, the term of this patent is extended or adjusted under 35 U.S.C. 154(b) by 0 days.

(21) Appl. No.: 17/626,909

(22) PCT Filed: Jul. 14, 2020

(86) PCT No.: PCT/EP2020/069875
§ 371 (c)(1),
(2) Date: Jan. 13, 2022

(87) PCT Pub. No.: WO2021/009167
PCT Pub. Date: Jan. 21, 2021

(65) Prior Publication Data
US 2022/0253654 A1    Aug. 11, 2022

(30) Foreign Application Priority Data
Jul. 17, 2019   (NL) .................................. 2023520

(51) Int. Cl.
*G06K 15/02*     (2006.01)
*G06F 3/12*      (2006.01)
(52) U.S. Cl.
CPC ........... *G06K 15/027* (2013.01); *G06F 3/126* (2013.01); *G06F 3/1208* (2013.01);
(Continued)

(58) Field of Classification Search
CPC ............ G06K 15/027; G06K 15/1852; G06K 15/1878; G06F 3/1208; G06F 3/1256; G06F 3/126
See application file for complete search history.

(56) References Cited

U.S. PATENT DOCUMENTS 8,405,881 B2 * 3/2013 Hayashi ............. G06K 15/1826
                                                        358/529
2006/0285862 A1 * 12/2006 Sakamoto .............. G03G 15/01
                                                        399/49
(Continued)

OTHER PUBLICATIONS

International Search Report and Written Opinion for the International Patent Application No. PCT/EP2020/069875, dated Sep. 17, 2020, 13 pages.
(Continued)

*Primary Examiner* — Quang N Vo
(74) *Attorney, Agent, or Firm* — KDB Firm PLLC

(57) ABSTRACT

A method for printing at least a first and a later print job includes receiving a first print job containing first image data of one or more first images to be printed in a printable area and a later print job containing later image data associated with a colour, determining a first sub-area of said printable area where no image of the first images is to be printed, using the first image data; printing the one or more first images in the printable area and at least one first control patch in the first sub-area, using for said at least one first control patch at least one colour representative for the colour associated with the later image data, measuring the colour of the printed at least one first control patch, and using the measured colour of the at least one first control patch for controlling the later print job.

20 Claims, 10 Drawing Sheets

(52) U.S. Cl.
CPC ....... *G06F 3/1256* (2013.01); *G06K 15/1852* (2013.01); *G06K 15/1878* (2013.01)

(56) References Cited

U.S. PATENT DOCUMENTS

2008/0247770 A1  10/2008  Morales et al.
2016/0248941 A1   8/2016  Kella et al.

OTHER PUBLICATIONS

Vanhoenacker, Mark, "Color Spots on packages: what are those things?" Jan. 8, 2013—URL: https://slate.com/culture/2013/01/color-spots-on-packages-what-are-those-things.html.

* cited by examiner

DIGITAL PRINTING METHOD AND SYSTEM USING CONTROL PATCHES

FIELD OF INVENTION

The field of the invention relates to a digital printing method and system for digitally printing, such as label printing or printing on packages. Particular embodiments relate to the field of digital printing using control patches.

BACKGROUND

In prior art digital printing it is desirable to print images such that the colours and/or density levels in the printed image approach the desired colours and/or density levels. However, in practice, typically deviations exist e.g. due to imperfections of the printing system, the type of substrate used, the type of ink or toner used, etc.

To limit such deviations various calibration methods exist where control patches are printed at a predetermined location on the substrate. An example of such a method is illustrated in FIG. 1, where it can be seen that a calibration patch P, P' is printed in between two print jobs. In the example, the first print job consists in printing a first image I, and the later print job consists in printing a later image I'. The substrate is moved in a movement direction M during printing, and before each print job, a calibration patch P, P' may be printed. Such calibration patches P, P' require additional space and have to be cut off in order to obtain the desired images.

According to yet other existing solution, control patches are printed and next analysed off-line. For example, a printer's colour gamut can be measured by generating print samples with varying amounts of CMYK inks and a spectrophotometer can be used to measure the amount of spectral light reflected from each sample. Based on such measurements the CMYK value combinations may be mapped to values of a device independent colour space such as the XYZ colour space or the LAB colour space. This mapping may be implemented by a look-up table. Such a look-up table can then be used to generate print data with the desired colours. However, such methods are complex and time-consuming.

SUMMARY

The object of embodiments of the invention is to provide a digital printing method and apparatus resulting in an improved image quality, and in particular in a printed colour or density which presents an improved match with a desired colour or density, without disturbing the normal printing operation.

According to a first aspect of the invention there is provided a digital printing method for digitally printing at least a first print job and a later print job to be executed after the first print job. The later print job may be a print job immediately following the first print job, or a print job which has to be executed some print jobs later. The method comprises the steps of:
  receiving a first print job containing first image data of one or more first images to be printed in a printable area and a later print job containing later image data associated with at least one colour and/or at least one density level;
  determining at least one first sub-area of said printable area where no image of said one or more first images is to be printed, using the first image data;
  printing the one or more first images in the printable area and at least one first control patch in the determined at least one first sub-area, using for said at least one first control patch at least one colour and/or at least one density level representative for the at least one colour and/or the at least one density level associated with the later image data;
  measuring the colour and/or density level of the printed at least one first control patch;
  using the measured colour and/or density level of the at least one first control patch for controlling the later print job.

Such a method has the technical advantage that a control patch relevant for a future later print job can be printed together with a previous first print job without requiring additional space on the substrate on which the one or more first images of the first print job are printed, and that the future later print job can be controlled based on a measurements performed on the first control patch. In that manner, it is possible to obtain a very good colour/density matching between a desired colour/density and the printed colour/density in the one or more images of the later print job, without the need for interrupting the print process and without requiring additional space on the substrate. In other words, print jobs can be printed one after the other in a continuous manner, whilst simultaneously performing colour matching by printing and measuring colour patches as described above.

Exemplary applications are label printing or printing on packages, as such printing applications typically comprise a print job with a large number of the same images with "free" space in between the images of the print job. For example, package blanks that need to be cut and folded after the printing stage will have unused areas in between the blanks.

Preferably, the step of determining of at least one first sub-area comprises interpreting the first image data of the first print job. Optionally, indications, such as cutting lines or cutting crosses, associated with the first image data of the first print job may be used to determine the at least one first sub-area. Alternatively or in addition, an operator may be provided with a user interface configured to allow a user to indicate the at least one first sub-area and/or with a user interface configured to suggest based on the first image data one or more suitable areas and allowing the user to indicate the at least one first sub-area by modifying and/or confirming the one or more suggested areas. In other words, the step of determining of at least one first sub-area may be fully automated without requiring user input, or may be partially automated allowing a user to indicate at least one sub-area or to check at least one suggested sub-area.

In exemplary embodiments, the first image data comprises first coloured images and cutting indications. For such embodiment, the at least one first sub-area can be easily derived in an automated manner using the first coloured images and cutting indications. Indeed, any areas outside of the used areas delimited by the cutting indications and containing a first coloured image, can be determined as the at least one first sub-area.

According to an exemplary embodiment, the digital printing method further comprises the steps of: determining at least one further first sub-area of said first printable area where no image of the one or more first images is to be printed, using the first image data, said at least one further first sub-area being located downstream of the at least one first sub-area; printing at least one further first control patch in the determined at least one further first sub-area, using for said at least one further first control patch at least one colour and/or at least one density level based on the measured colour and/or density level of the at least one first control patch; measuring the colour and/or density level of the at least one further first control patch. The steps above may be repeated a number of times, for example until a desired colour or density level is measured. The measured colour and/or density level of the at least one further first control patch may then be used for controlling the later print job.

In other words, this embodiment allows reprinting the control patch within the same first print job with a corrected colour/density without changing the colours/densities used for printing the first print job. In other words, the measured results are used to correct the colour/density in a further first control patch associated with the colour/density to be printed in the later print job. The skilled person understands that this iterative process may be further optimised for obtaining a high degree of accuracy. Such iterative process is particularly interesting if the first print job is a rather larger job, e.g. containing a large number of images.

According to an exemplary embodiment, the digital printing method further comprises the steps of: receiving a second print job to be printed between the first and the later print job, said second print job containing second image data of one or more second images to be printed in a second printable area; determining at least one second sub-area of said second printable area where no image of the one or more second images are to be printed, using the second image data; printing the one or more second images in the second printable area and at least one second control patch in the determined at least one second sub-area, using for said at least one second control patch at least one colour and/or at least one density level based on the measured colour and/or density level of the at least one first control patch; measuring the colour and/or density level of the at least one printed second control patch; using the measured colour and/or density level of the at least one second control patch for controlling the later print job.

In other words, this embodiment allows reprinting the control patch as part of the second print job with a corrected colour/density. According to this embodiment, one is looking more than one print job ahead, such that a corrected control patch can be printed together with the second print job. Such an embodiment may be useful when the print jobs are relatively short. The skilled person understands that this process may be further optimised for obtaining a high degree of accuracy depending on the type of print jobs that are typically received. For example, one could also look more than two print jobs ahead.

According to an exemplary embodiment, the digital printing method further comprises the steps of: receiving a second later print job to be printed after the later print job, said second later print job containing second later image data associated with at least one colour and/or at least one density level; wherein the step of printing the one or more first images in the printable area comprises also printing at least one further first control patch in the determined at least one first sub-area, using for said at least one further first control patch at least one colour and/or at least one density level representative for the at least one colour and/or the at least one density level associated with the second later image data; measuring the colour and/or density level of the printed at least one further first control patch; using the measured colour and/or density level of the at least one further first control patch for controlling the second later print job.

In other words, according this embodiment control patches for two later print jobs are included in the same first print job. This may be useful when the first later print job is not suitable for printing sufficient control patches for the second later print job.

According to an exemplary embodiment, using the measured colour and density level of the at least one first control patch for controlling the later print job comprises determining at least one correction value for the at least colour and/or density level associated with the later print job; and performing the later print job based on said at least one correction value. It is noted that the step of using may comprise an iterative process of printing corrected one or more further control patches, measuring those one or more corrected further control patches, and determining at least one correction value for the at least colour and/or density level associated with the later print job, based on the measurements of those one or more further control patches.

Preferably, the printing comprises Raster Image Processing, RIP, of the first image data and screening of the processed first image data for generating first print data.

Preferably, the printing comprises the merging of the first image data with the at least one first control patch. In other words, a new image data may be composed based on the first image data and image and position data of the at least one first control patch.

This merging may be done between the raster image processing and the screening. In other words the processed first image data may be combined with image and position data of the at least one first control patch, whereupon the composed new image data may be screened, and provided to a printing device. In that manner, the merging can be done in the hardware, resulting in a fast process.

In another embodiment, the merging may be done after the screening. In other words the processed and screened first image data may be combined with image and position data of the at least one first control patch, and provided to a printing device. In that manner, the merging can be done in the hardware, resulting in a fast process.

Alternatively, the merging may be performed during rendering of the first image data during the raster image processing. However, usually this will require more time than performing the merging after the raster image processing, and for that reason the previous option is usually preferred.

According to yet another alternative, the merging is performed prior to the raster image processing. However, usually this will require more time than performing the merging after or during the raster image processing, and for that reason the previous options are usually preferred.

According to an exemplary embodiment, the step of printing at least one first control patch comprises printing a plurality of first control patches using a plurality of different colours and/or density levels representative for each of the at least one colour and/or the at least one density level associated with the later image data. The step of printing at least one first control patch may comprise printing a control patch using a target colour and/or density level associated with the later image data, and at least two, preferably at least four control patches in different colours close to the target colour. It is noted that embodiments of the invention may print only one colour per target colour or may print multiple colours per target colour, e.g. the target colour, an adjusted target colour with more and/or less of colour C (cyan), an adjusted target colour with more and/or less of colour M (magenta), etc. The skilled person understands that by adding more colours, the printed colour patches will have faster a printed colour corresponding with the correct target colour.

According to a second aspect of the invention, there is provided a digital printing system for digitally printing, at least a first print job and a later print job to be executed after the first print job. The digital printing system comprises an image processing module and a measurement device. The image processing module is configured to receive a first print job containing first image data of one or more first images to be printed in a printable area and a later print job containing later image data associated with at least one colour and/or at least one density level; and to determine at least one first sub-area of said printable area where no image of said one or more first images is to be printed, using the first image data. The printing device is configured to print the one or more first images in the printable area and at least one first control patch in the determined at least one first sub-area. The image processing module is configured to control the printing device such that for said at least one first control patch at least one colour and/or at least one density level representative for the at least one colour and/or the at least one density level associated with the later image data, is used. The measurement device is configured to measure the colour and/or density level of the printed at least one first control patch. The image processing module is configured to use the measured colour and/or density level of the at least one first control patch for controlling the later print job.

The advantage and preferred features set out above for the method apply mutatis mutandis for the system.

Preferably, the image processing module comprises a patch area determination module configured to perform at least one of: interpreting the first image data of the first print job; using cutting lines associated with the first image data of the first print job; providing an operator with a user interface configured to allow a user to indicate the at least one first sub-area; providing an operator with a user interface configured to suggest based on the first image data one or more suitable areas and allowing the user to indicate the at least one first sub-area by modifying and/or confirming the one or more suggested areas.

Preferably, the image processing module is further configured to determine at least one further first sub-area of said first printable area where no image of the one or more first images is to be printed, using the first image data, said at least one further first sub-area being located downstream of the at least one first sub-area; and to control the printing device such that at least one further first control patch in the determined at least one further first sub-area is printed using for said at least one further first control patch at least one colour and/or at least one density level based on the measured colour and/or density level of the at least one first control patch. The measurement device is further configured to measure the colour and/or density level of the at least one further first control patch; and the image processing module is further configured to use the measured colour and/or density level of the at least one further first control patch for controlling the later print job.

Preferably, the image processing module comprises a Raster Image Processing, RIP, module and a screening module configured for generating first print data based on the first image data and later print data based on the later image data.

Preferably, the image processing module is configured for merging of the first image data with the at least one first control patch in order to generate first print data for printing the one or more first images and the at least one first control patch.

In an exemplary embodiment, the image processing module comprises a colour mapping module configured to determine a colour and/or density level for the later print job based on the measured colour and/or density level. The colour mapping module may be further configured to determine a colour and/or density level to be used for the at least one further first control patch (in this embodiment a corrected first control patch is printed with the first print job) and/or for the at least one second control patch (in this embodiment a corrected control patch is printed with the second print job, as described above for the method) based on the measured colour and/or density level of the at least one first control patch.

Preferably, the RIP module is configured to generate processed first image data and processed later image data based on the received first image data and the received later image data, wherein the image processing module comprises an image merging module configured to use the processed first image data, at least one colour and/or at least one density level representative for the at least one colour and/or the at least one density level associated with the later image data, and the determined at least one first sub-area to generate modified processed first image data comprising the at least one first control patch. The screening module is configured to screen the modified processed first image data. The image merging module may be further configured to use the processed first image data, the measured colour and/or density level of the at least one first control patch, and the determined at least one further first sub-area to generate modified processed first image data comprising the at least one further first control patch; and the screening module may then be configured to screen the modified processed first image data.

According to a further aspect of the invention, there is provided a computer program comprising computer-executable instructions to perform one or more steps of the method according to any one of the embodiments disclosed above, when the program is run on a computer. According to a further aspect of the invention, there is provided a computer device or other hardware device programmed to perform one or more steps of any one of the embodiments of the method disclosed above. According to another aspect there is provided a data storage device encoding a program in machine-readable and machine-executable form to perform one or more steps of any one of the embodiments of the method disclosed above.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

FIGS. 2-4 and FIG. 7 illustrate exemplary embodiments of a digital printing method for digitally printing at least a first print job 110 and a later print job 120 to be executed after the first print job. In the examples, the later print jobs immediately follows after the first jobs, but it is also possible that one or more further print jobs are present between the first print job 110 and the later print job 120.

Figure 1:
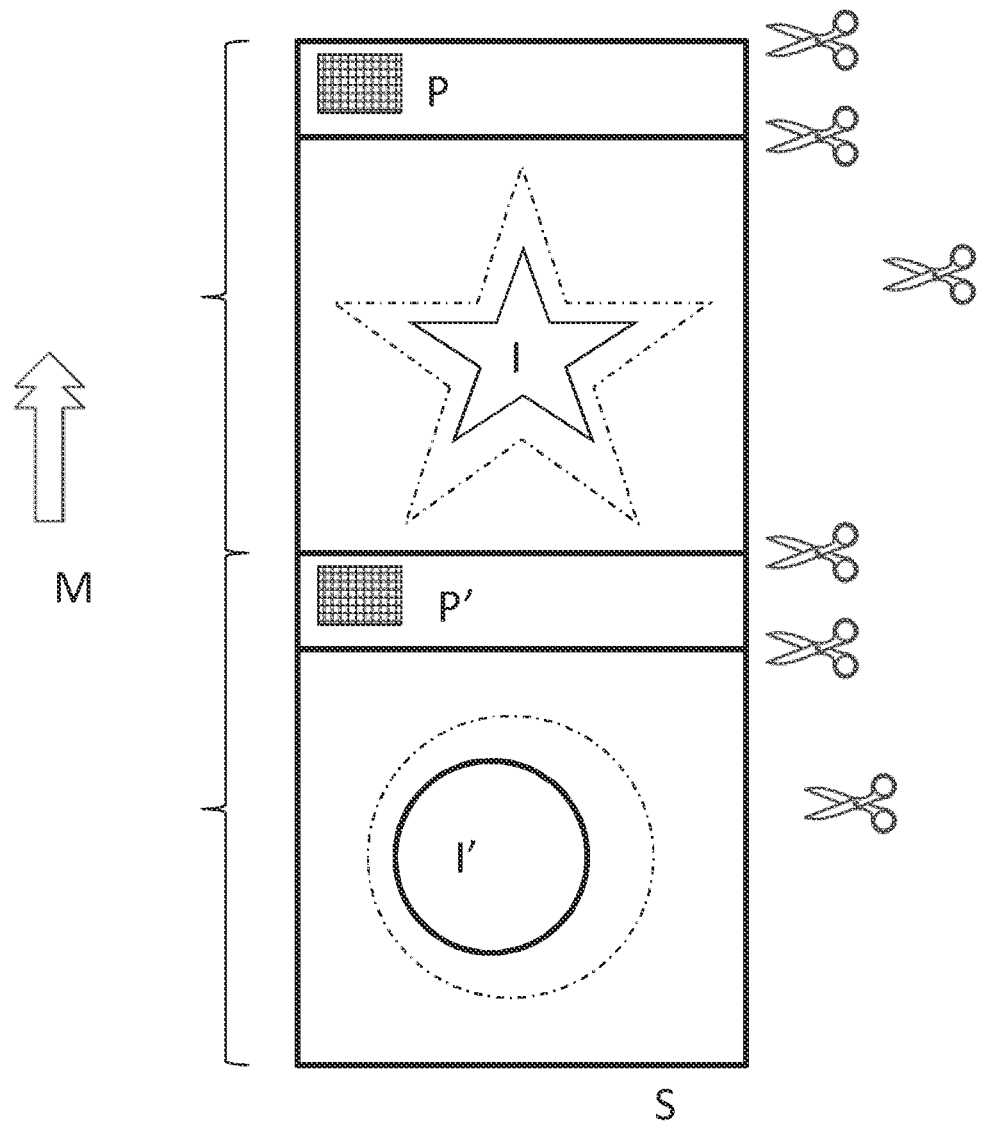
FIG. 1 illustrates schematically a prior art method of printing control patches on a printing medium.
Figure 2:
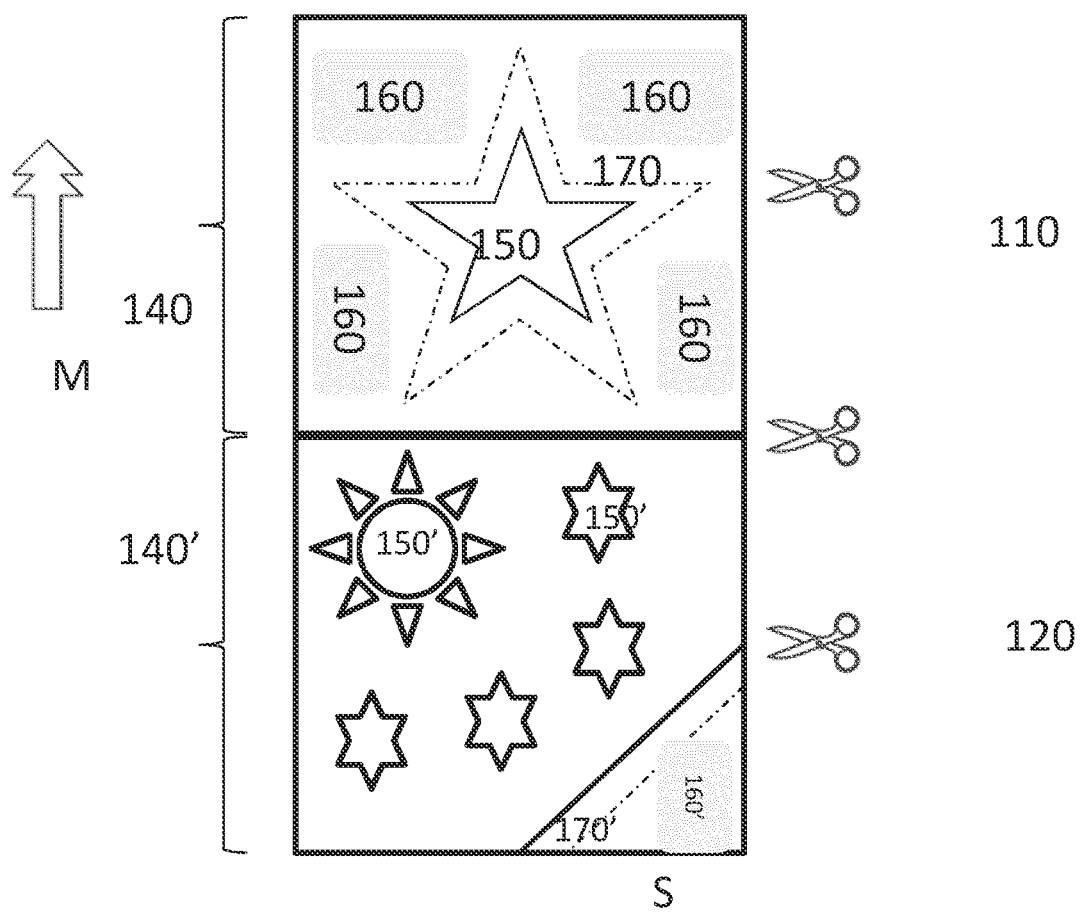
FIG. 2-4 illustrate schematically exemplary embodiments of printing control patches on a printing medium.
Figure 7:
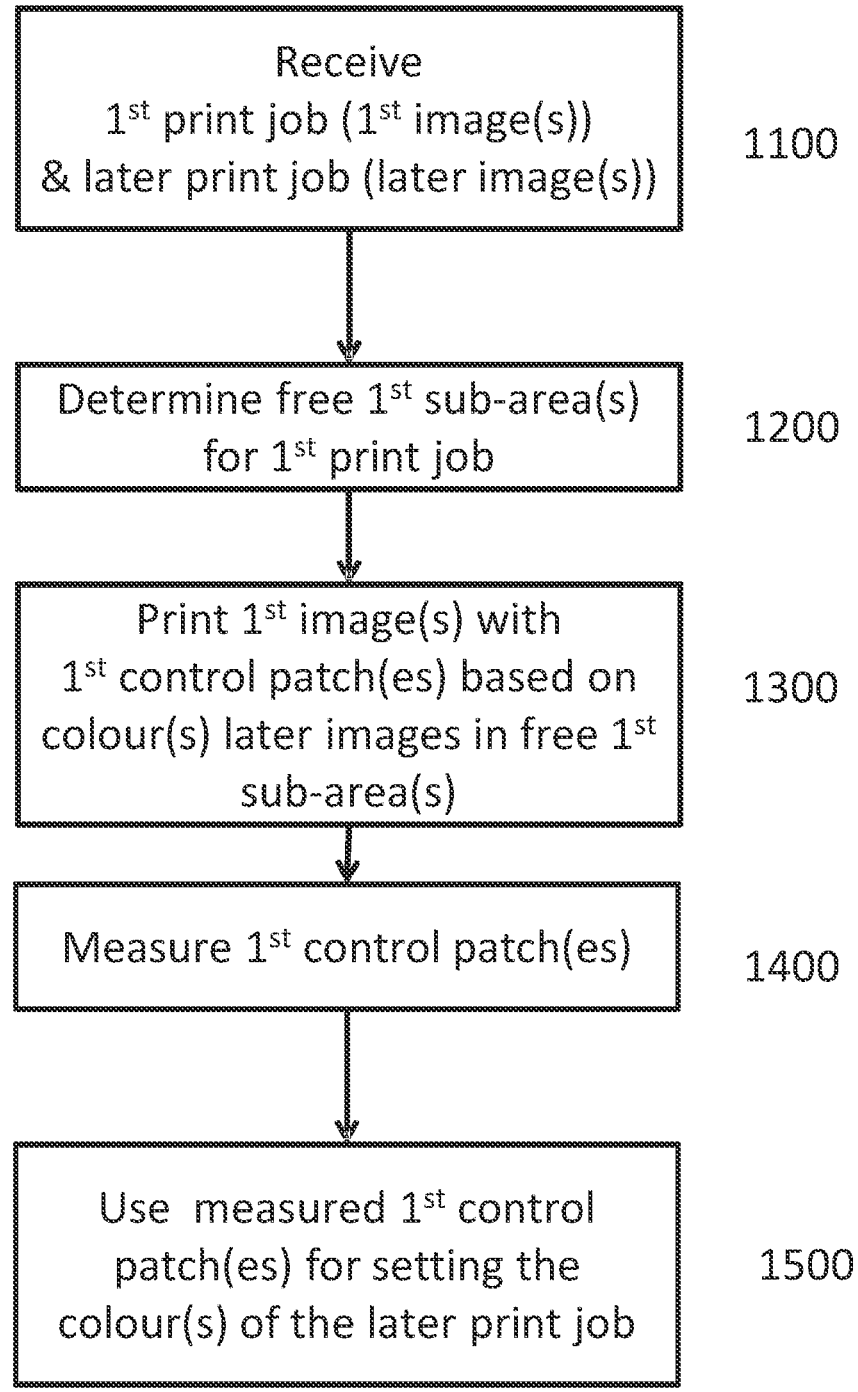
FIGS. 7-10 are flow charts of exemplary embodiments of a digital printing method.

The method comprises the steps 1100, 1200, 1300, 1400, 1500 of FIG. 7. In the first step 1100 a first print job 110 and a later print job 120 are received. The first print job 110 contains first image data of one or more first images 150 to be printed in a printable area 140 and the later print job 120 contains later image data of one or more later images 150' associated with at least one colour and/or at least one density level. FIG. 2 illustrates the one or more first images 150 and the one or more later images 150'. It is noted that although FIG. 2 shows only one first image 150 and only a couple of later images 150', typically a large number of images may be included in a print job, e.g. more than ten images or more than hundred images or even more than thousand images, wherein the images may be the same or different. For example, for label printing of for printing blanks for packaging products typically a very large number of the same images are printed in the same print job. As illustrated, a print job 110, 120 may comprise images 150, 150' as well as cutting indications 170, 170'.

In the second step 1200, at least one first sub-area 160 of the printable area where no image of said one or more first images is to be printed, is determined, using the first image data. Preferably, the determining comprises interpreting the first image data of the first print job 110. Optionally, indications, such as cutting lines 170 or cutting crosses, associated with the first image data of the first print job 110 may be used to determine the at least one first sub-area 160. Alternatively or in addition, an operator may be provided with a user interface configured to allow a user to indicate the at least one first sub-area and/or with a user interface configured to suggest based on the first image data one or more suitable areas and allowing the user to indicate the at least one first sub-area by modifying and/or confirming the one or more suggested areas. FIG. 2 illustrates an example where for the first print job four first sub-areas 160 are determined, and for the later print job one later sub-area 160' is determined. It is noted that although FIG. 2 shows only four first sub-areas 160 and only one later sub-area 160', typically a large number of sub-areas may be included in a print job, e.g. more than 10 sub-areas. For example, for label printing of for printing blanks for packaging products typically a large number of images are printed in the same print job such that many sub-areas exist between the images.

Figure 3:
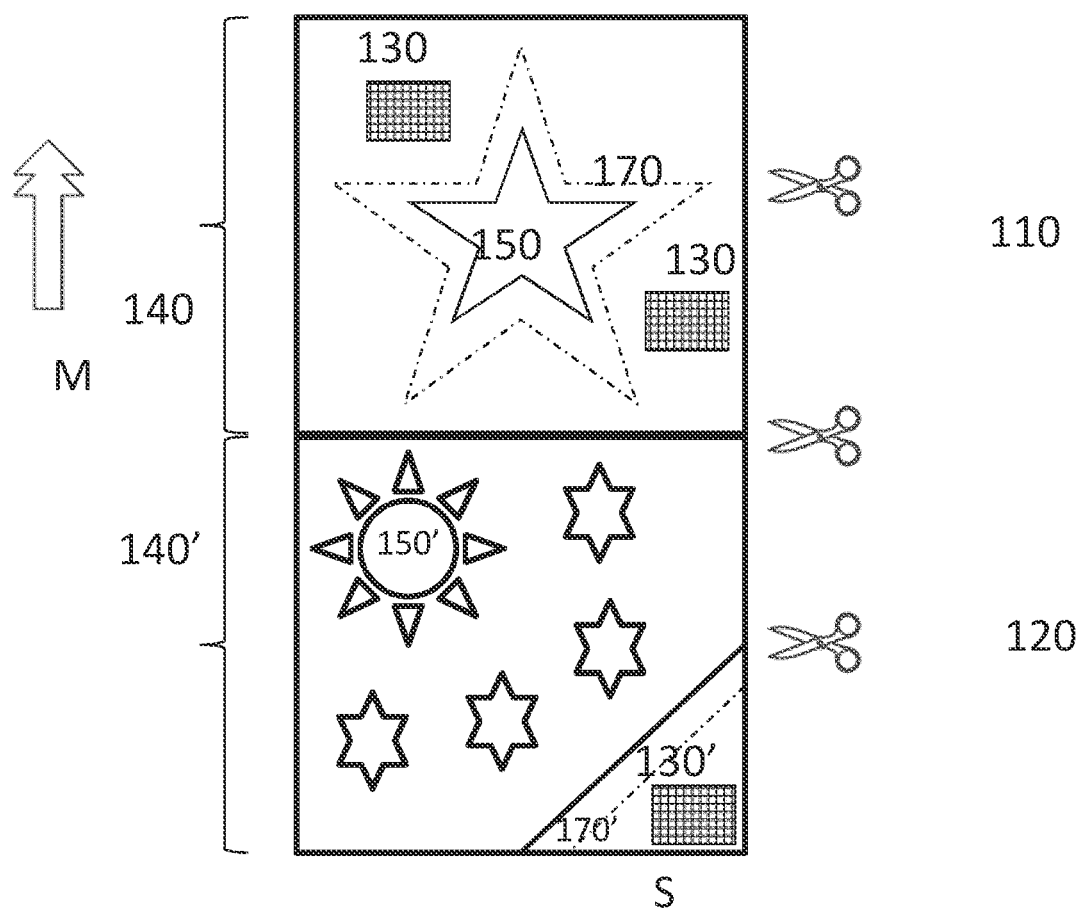

In the third step 1300, the one or more first images 150 are printed in the printable area 140 and at least one first control patch 130 is printed in the determined at least one first sub-area 160, using for said at least one first control patch at least one colour and/or at least one density level representative for the at least one colour and/or the at least one density level associated with the later image data. This is illustrated in FIG. 3, where two control patches 130 are printed in the first sub-areas 160.

The control patches 130 may be the same or different. For example, a first set of colour variations may be included in a first control patch 130 and a second set of colour variations may be included in the second control patch 130. The step 1300 of printing at least one first control patch 130 may comprise printing a plurality of first control patches 130 using a plurality of different colours and/or density levels representative for each of the at least one colour and/or the at least one density level associated with the later image data. The step 1300 of printing at least one first control patch 130 may comprise printing a first control patch 130 using a target colour and/or density level associated with the later image data, and at least two, preferably at least four control patches 130 in different colours close to the target colour. As will be explained below with reference to further developed embodiments, the first control patch 130 may be measured and the measurement results may be used to determine the colour(s) and/or density level(s) of a further first control patch 130 printed as part of the first print job 110, downstream of a previous first control patch 130 printed as part of the first job 110.

The printing of the first print job 110 may comprise Raster Image Processing, RIP, of the first image data and screening of the processed first image data for generating first print data, wherein the first image data is merged with image data for the at least one first control patch so that the first print data includes print data for printing the at least one first control patch 130. The merging may be performed after the raster image processing, preferably between the raster image processing and the screening. Alternatively, the merging may be performed during rendering of the first image data during the raster image processing, or even prior to the raster image processing.

In the fourth step 1400, the colour and/or density level of the printed at least one first control patch 130 are measured, and in the fifth step 1500 the measured colour and/or density level of the at least one first control patch 130 is used for controlling the later print job. In other words, the measured colour and/or density level of the at least one first control patch 130 is used for printing the one or more later images 150' of the later print job 120.

FIGS. 2 and 3 further illustrates that also for the later print job 120 one or more later sub-areas 160' may be determined, and that when printing the later print job 120, one or more later control patches 130' for an even later print job may be included in a similar way as for the first print job 110. In other words, the steps 1200, 1300 and 1400 may also be performed for the later print job, and the skilled person understands that the method may be continuously applied for consecutive print jobs.

Thus, one or more control patches 130 relevant for a future later print 120 job are printed together with a previous first print job 110 without requiring additional space on the substrate S on which the one or more first images 150 of the first print job 110 are printed, and the future later print job 120 is controlled based on a measurements performed on the one or more first control patches 130. In that manner, a very good colour/density matching can be obtained between a desired colour/density and the printed colour/density in the one or more later images 150' of the later print job 120, without the need for interrupting the print process and without requiring additional space on the substrate S. Indeed, the substrate S can move continuously in a movement direction M during printing whilst continuously including control patches in unused areas, so that a continuous correction can be performed. In other words, print jobs 110, 120 can be printed one after the other in a continuous manner, whilst simultaneously performing colour matching by printing and measuring colour patches 130, 130' as described above.

The step 1200 of determining of at least one first sub-area 160, 160' typically comprises interpreting the first image data of the first print job. To that end existing interpretation techniques may be used as known to the person skilled in the art. In preferred embodiments, indications, such as cutting lines 170 or crosses, associated with the first image data of the first print job 110 may be used to determine the at least one first sub-area 160.

Optionally, the step 1200 of determining of at least one first sub-area may comprise at least one of providing an operator with a user interface configured to allow a user to indicate the at least one first sub-area, and providing an operator with a user interface configured to suggest based on the first image data one or more suitable areas and allowing the user to indicate the at least one first sub-area by modifying and/or confirming the one or more suggested areas. In that manner, the user can either indicate the unused zones himself (this may be an option for print jobs where it is difficult to know which areas will not be used), or can confirm the suggestion which is made based on the interpreted first image data. For example, when cutting indications are available, it will be relatively simple to suggest the unused areas to the user with a high degree of certainty.

Figure 5:
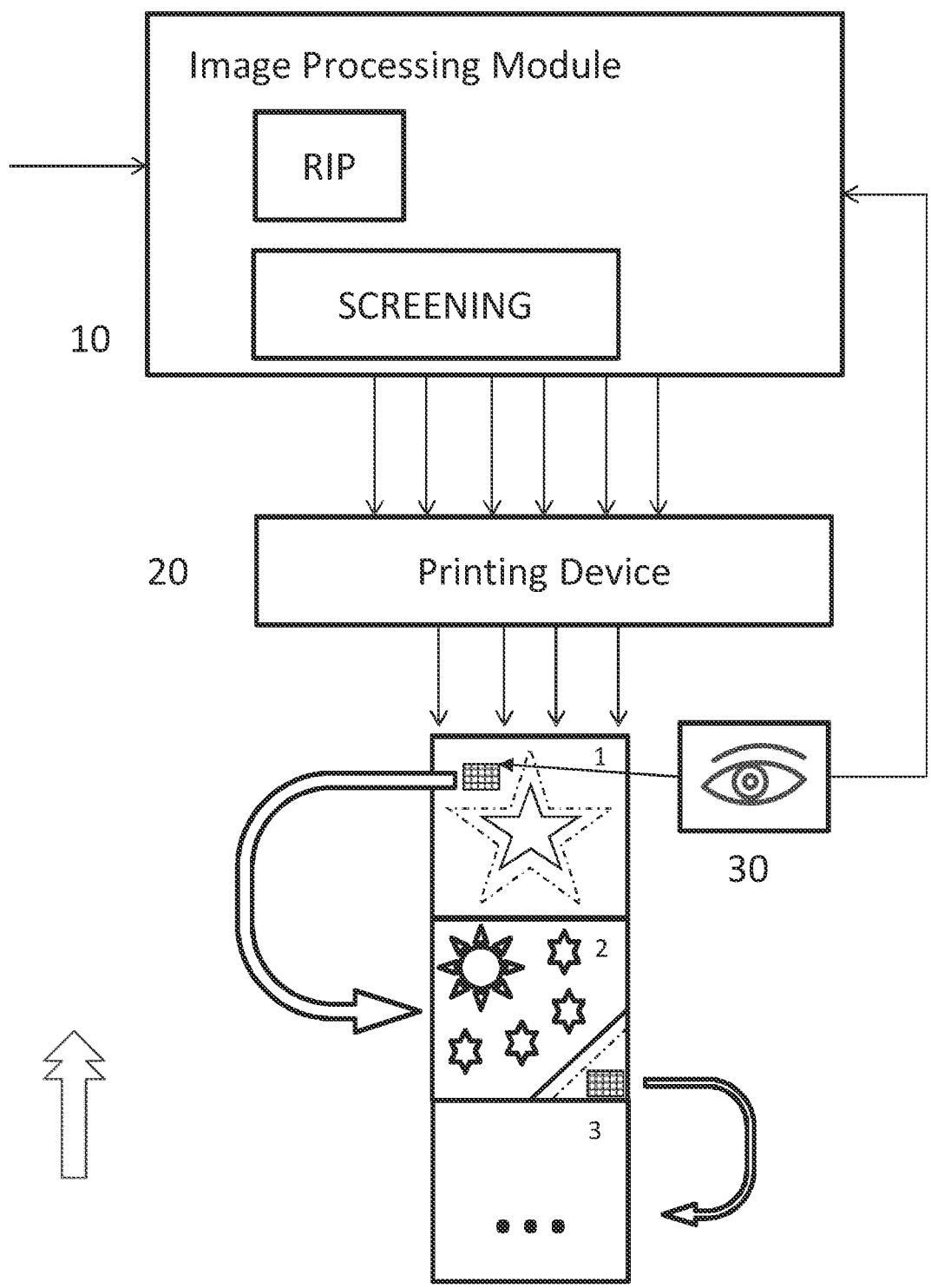
FIG. 5 illustrates schematically an exemplary embodiment of a digital printing system.

FIG. 5 illustrates schematically an exemplary embodiment of a digital printing system for digitally printing at least a first print job and a later print job to be executed after the first print job. The digital printing system comprises an image processing module 10, a printing device 20, and a measurement device 30. The image processing module 10 is configured to receive a first print job 110 containing first image data of one or more first images 150 to be printed in a printable area 140 and a later print job 120 containing later image data associated with at least one colour and/or at least one density level, and to determine at least one first sub-area 160 of said printable area where no image of said one or more first images 150 is to be printed, using the first image data. The printing device 20 is configured to print the one or more first images 150 in the printable area and at least one first control patch 130 in the determined at least one first sub-area 160. The image processing module 10 is further configured to control the printing device 20 such that for said at least one first control patch 130 at least one colour and/or at least one density level representative for the at least one colour and/or the at least one density level associated with the later image data, is used. The measurement device 30 is configured to measure the colour and/or density level of the printed at least one first control patch 130. The image processing module 10 is configured to use the measured colour and/or density level of the at least one first control patch 130 for controlling the later print job 120. The image processing module 10 is configured for merging of the first image data with the at least one first control patch in order to generate first print data for printing the one or more first images 150 and the at least one first control patch 130.

The digital printing system of FIG. 5 may be used to perform to method of any one of the embodiments of the invention, and the technical advantages explained in connection with the method apply mutatis mutandis for the system.

Now a further developed exemplary embodiment of the method will be explained with reference to FIG. 8 and FIG. 4. The digital printing method comprises the steps 1100, 1200, 1300, 1400 which are similar to the steps of FIG. 7, and in additions the steps 1210, 1310, 1410, and 1510. In step 1200, a first sub-area 160a is determined, in step 1300 a first control patch 130a is printed and in step 1400, the first control patch 130a is measured.

In step 1210, at least one further first sub-area 160b, 160c, 160d (see also FIG. 4) of the first printable area where no image of the one or more first images 150 is to be printed, is determined, using the first image data. The at least one further first sub-area 160b, 160c, 160d is located downstream of the first sub-area 160a, seen in the movement direction M. it is noted that the determination of the first sub-areas 160a, 160b, 160c, 160d may take place in one step 1400 or in multiple steps and those multiple steps may be performed one after the other or as needed. For example, step 1210 could be performed also in between steps 1200 and 1300, or in between steps 1300 and 1400. Optionally, after step 1400, it may be checked of the measured colour and/or density level matches with the desired colour and/or density level, and steps 1210-1410 may be conditional steps which are only performed when the measured colour and/or density level does not match with the desired colour and/or density level.

In step 1310, at least one further first control patch 130b is printed in the determined at least one further first sub-area 160b, using for said at least one further first control patch 130b at least one colour and/or at least one density level based on the measured colour and/or density level of the at least one first control patch 130a, and taking into account the target colour of the one or more later images. In step 1410, the colour and/or density level of the at least one further first control patch is measured.

Figure 4:
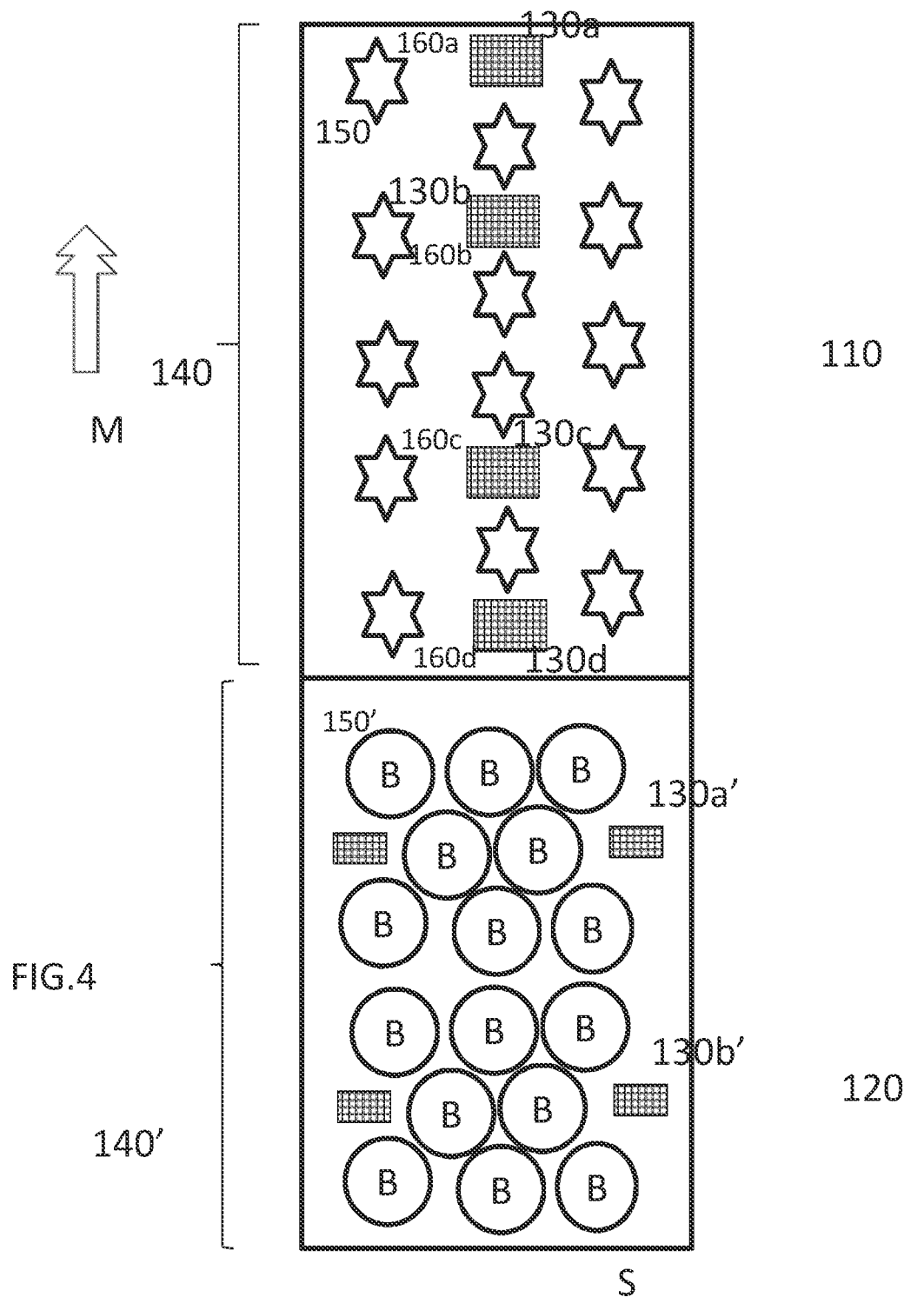

The steps 1210, 1310, 1410 above may be repeated a number of times, see further first control patches 130c, 130d in FIG. 4, until the measured colour and/or density level of the further first control patch 130c, 130d matches the desired colour and/or density level.

In step 1510, the measured colour and/or density level of the at least one further first control patch 130b or 130c or 130d (depending on the number of iterations that is done) is used for controlling the later print job.

Figure 8:
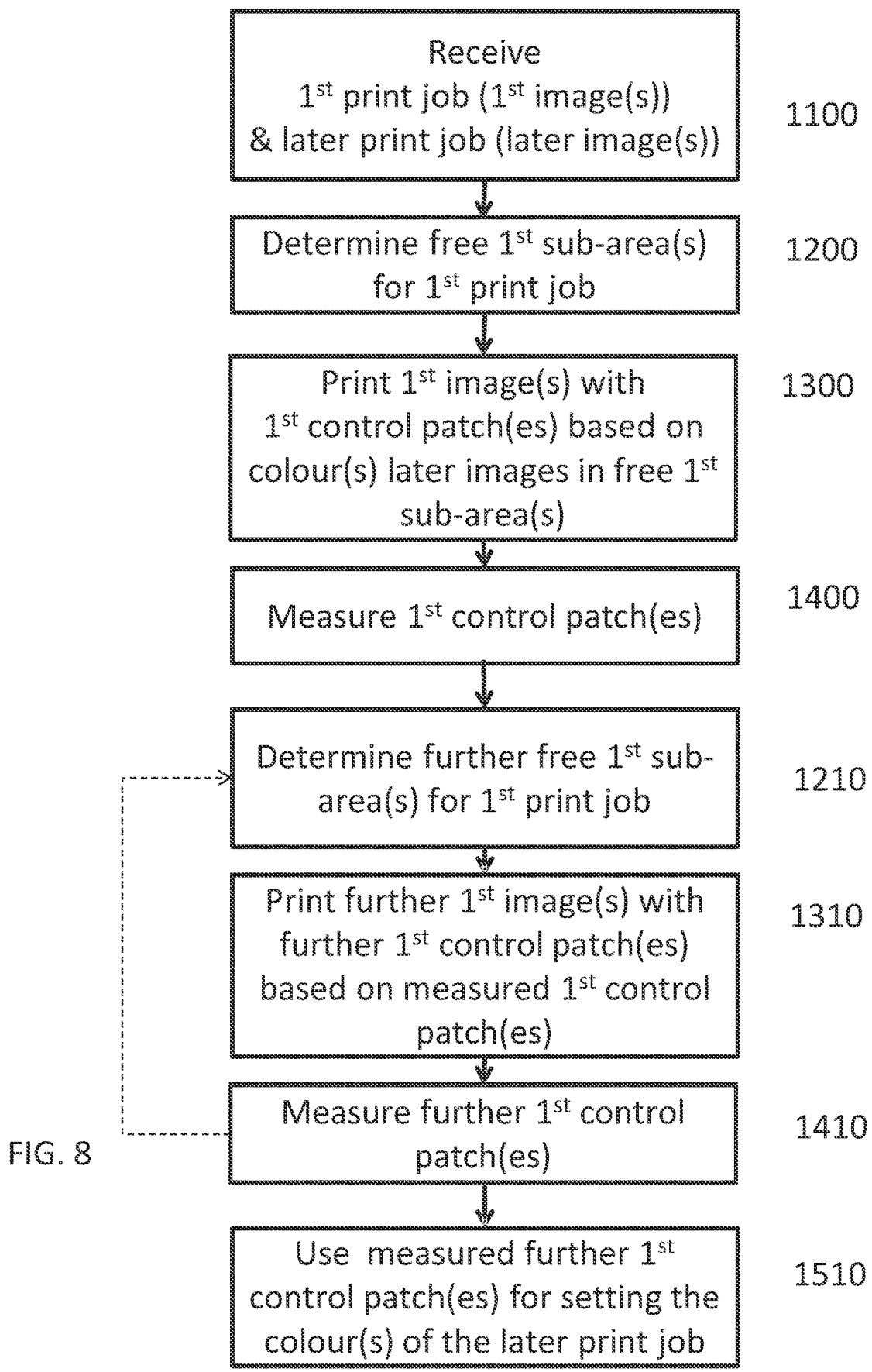

When the embodiment of FIGS. 4 and 8 is used, the image processing module 10 of FIG. 5 may be further configured to determine at least one further first sub-area 160b of said first printable area where no image of the one or more first images is to be printed, using the first image data, said at least one further first sub-area 160b being located downstream of the at least one first sub-area 160. The image processing module 10 is then further configured to control the printing device 20 such that at least one further first control patch 130b is printed in the determined at least one further first sub-area 160b, using for said at least one further first control patch 130b at least one colour and/or at least one density level based on the measured colour and/or density level of the at least one first control patch 130a. The measurement device 30 may then be further configured to measure the colour and/or density level of the at least one further first control patch 130b, and the image processing module 10 may then be configured to use the measured colour and/or density level of the at least one further first control patch 130b, 130c, 130d (depending on the number of iterations) for controlling the later print job.

Figure 6:
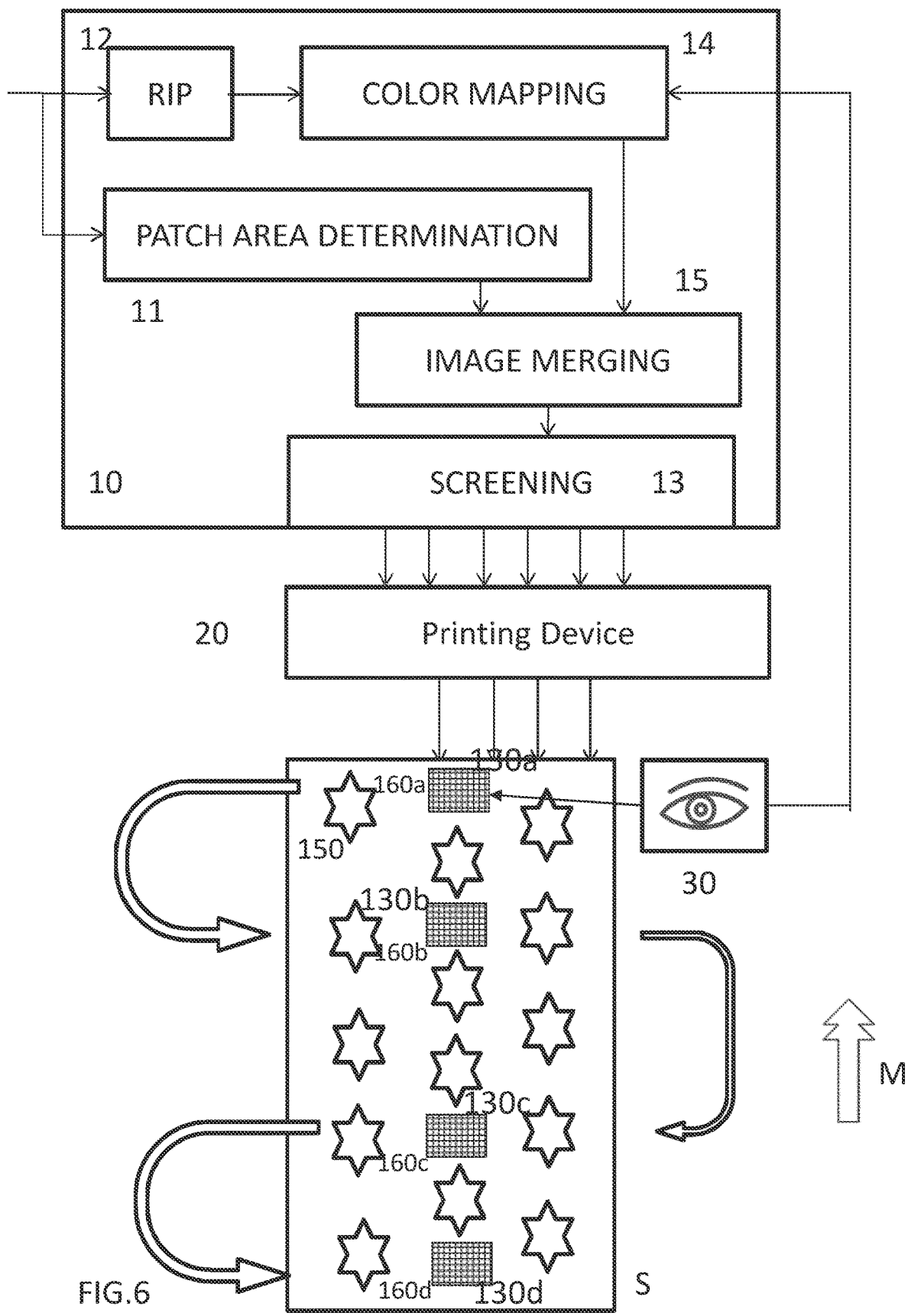
FIG. 6 illustrates schematically a preferred embodiment of a digital printing system.

FIG. 6 illustrates a further developed exemplary embodiment of digital printing system comprising an image processing module 10, a printing device 20, and a measurement device 30, which may be configured as described above in connection with FIG. 5. The image processing module 10 comprises a patch area determination module 11, a RIP module 12, a screening module 13, a colour mapping module 14 and an image merging module 15.

The patch area determination module 11 may be configured to interpret the first image data of the first print job to determine the one or more first sub-areas 160a, 160b, 160c, 160d. Optionally, indications, such as cutting lines 170, associated with the first image data of the first print job 110 may be used for this determination, see also FIGS. 2 and 3 which have been discussed above. In addition or alternatively, the patch area determination module 11 may be configured to provide an operator with a user interface configured to allow a user to indicate the at least one first sub-area, and/or to provide an operator with a user interface configured to suggest based on the first image data one or more suitable areas and allowing the user to indicate the at least one first sub-area by modifying and/or confirming the one or more suggested areas.

The Raster Image Processing, RIP, module 12 is configured for raster image processing the first and later image data. The screening module 13 is configured for generating first print data based amongst others on the first image data and later print data based amongst others on the later image data.

The colour mapping module 14 is configured to determine a colour and/or density level for the later print job based on a measured colour and/or density level of a control patch printed in a previous print job. In addition, in an embodiment as described above in connection with FIGS. 4 and 8, the colour mapping module 14 may be configured to determine a colour and/or density level to be used for the at least one further first control patch 130b, 130c, 130d based on the measured colour and/or density level of a previous first control patch, see also the arrows indicated in FIG. 6. In other words, this embodiment allows reprinting the control patch within the same first print job with a corrected colour/density without changing the colours/densities used for printing the first print job, i.e. the colour mapping of the first image data will not be affected by the printing of the one or more further first control patches. This iterative process may be repeated multiple times until the desired colour and/or density level is achieved, and whilst not interrupting the printing process. It is noted that for the very first print job, a couple of colour patches (not shown) could be printed beforehand in order make sure that also the first print job is printed with the correct colour and/or density level.

The RIP module 12 is configured to generate processed first image data and processed later image data based on the received first image data and the received later image data. The image merging module 15 here located between the RIP module 12 and the screening module 13 and is configured to use the processed first image data, at least one colour and/or at least one density level representative for the at least one colour and/or the at least one density level associated with the later image data, and the determined at least one first sub-area to generate modified processed first image data comprising the at least one first control patch. The screening module 13 is then configured to screen the modified processed first image data.

In an embodiment as described above in connection with FIGS. 4 and 8, the image merging module 15 may be configured to use the processed first image data, the measured colour and/or density level of the at least one first control patch 130a, and the determined at least one further first sub-area 160b, 160c, 160d, to generate modified processed first image data comprising the at least one further first control patch 130b, 130c, 130d. The screening module may then be configured to screen the modified processed first image data.

It is noted that the image data may be streamed from the image processing module 10 to the printing device 20, and that the measured control patch data may be continuously provided to the colour mapping module 14 and merged with the image data as the image data is being streamed. For example, in an embodiment as described above in connection with FIGS. 4 and 8, a first part of the first image data may be merged with the first control patch 130a, a second part of the first image data may be merged with the first control patch 130b, etc.

It is further noted that the embodiment of FIG. 6 has the advantage that the image merging is done between the raster image processing and the screen, and can be done in the hardware resulting in a very fast process. In alternative embodiments, the merging may be done after the screening, before the raster image processing, or during the raster image processing as described above.

Figure 9:
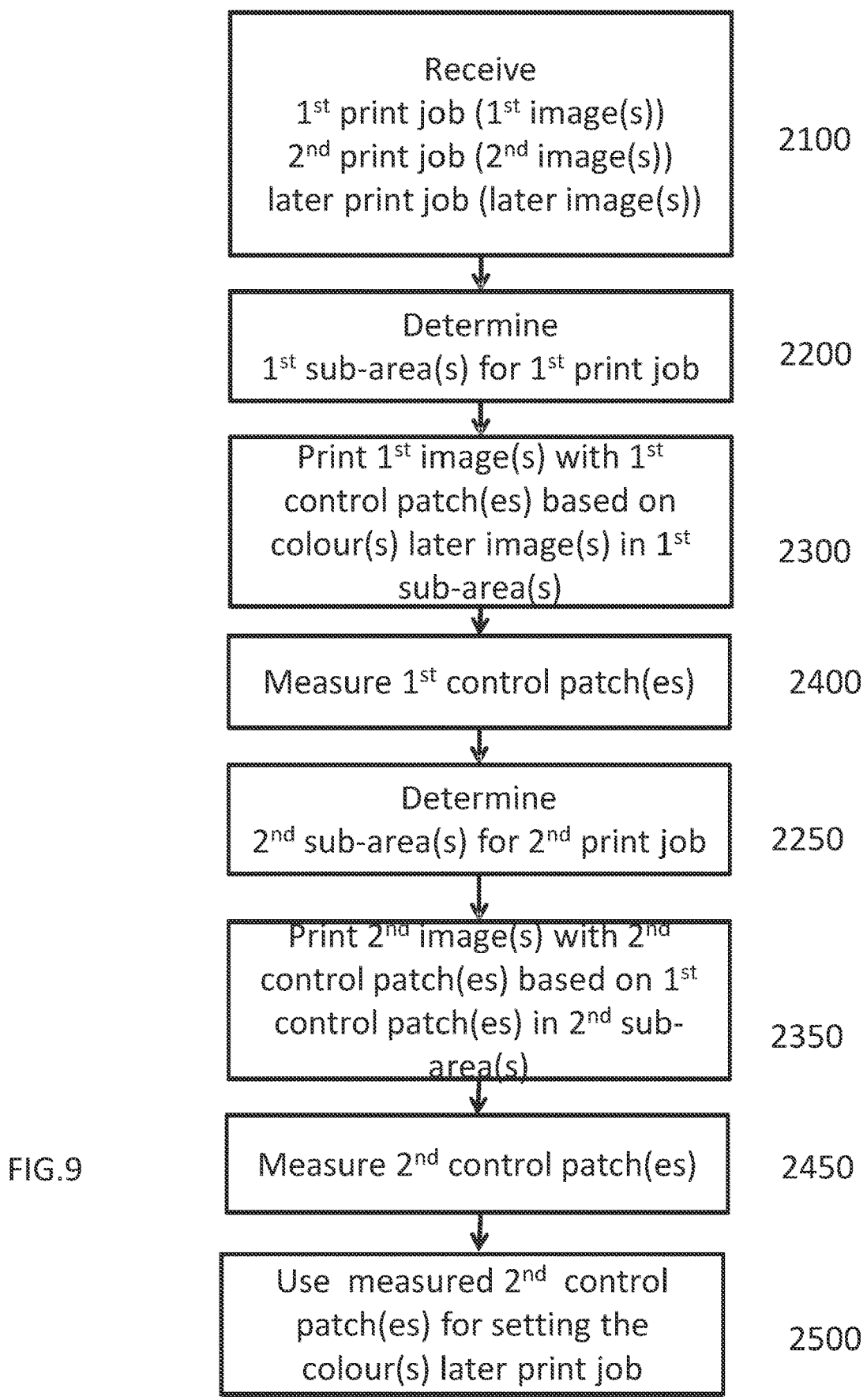

FIG. 9 illustrates another exemplary embodiment of a digital printing method comprising the steps 2100-2500. In a first step 2100, a first print job, a second print job and a later print job are received. The first print job contains first image data of one or more first images to be printed in a printable area. The second print job is to be printed between the first and the later print job, and the second print job contains second image data of one or more second images to be printed in a second printable area. The later print job contains later image data of one or more later images associated with at least one colour and/or at least one density level.

In a second step 2200, at least one first sub-area of the printable area where no image of said one or more first images is to be printed, is determined, using the first image data.

In a third step 2300, the one or more first images are printed in the printable area and at least one first control patch is printed in the determined at least one first sub-area, using for said at least one first control patch at least one colour and/or at least one density level representative for the at least one colour and/or the at least one density level associated with the later image data.

In a fourth step 2400, the colour and/or density level of the printed at least one first control patch is measured.

In a fifth step 2250, at least one second sub-area of the printable area where no image of said one or more second images is to be printed, is determined, using the second image data.

In a sixth step 2350, the one or more second images are printed in the printable area and at least one second control patch is printed in the determined at least one second sub-area, using for said at least one second control patch at least one colour and/or at least one density level based on the measured colour and/or density level of the at least one first control patch, further taking into account the target colour.

In a seventh step 2450, the colour and/or density level of the printed at least one second control patch is measured.

In an eighth step 2500, the measured colour and/or density level of the at least one second control patch is used for controlling the later print job. In other words, the measured colour and/or density level of the at least one second control patch is used for printing the one or more later images of the later print job.

The embodiment of FIG. 9 allows reprinting a corrected second control patch during a second print job with a corrected colour/density. According to this embodiment, there is at least one print job between the first and the later print job, such that a corrected second control patch can be printed together with the second print job. Such an embodiment may be useful when the print jobs are relatively short.

The skilled person understands that the method of FIGS. 8 and 9 may be combined, and that the method may be further optimised for obtaining a high degree of accuracy depending on the type and length of print jobs that are typically received.

Figure 10:
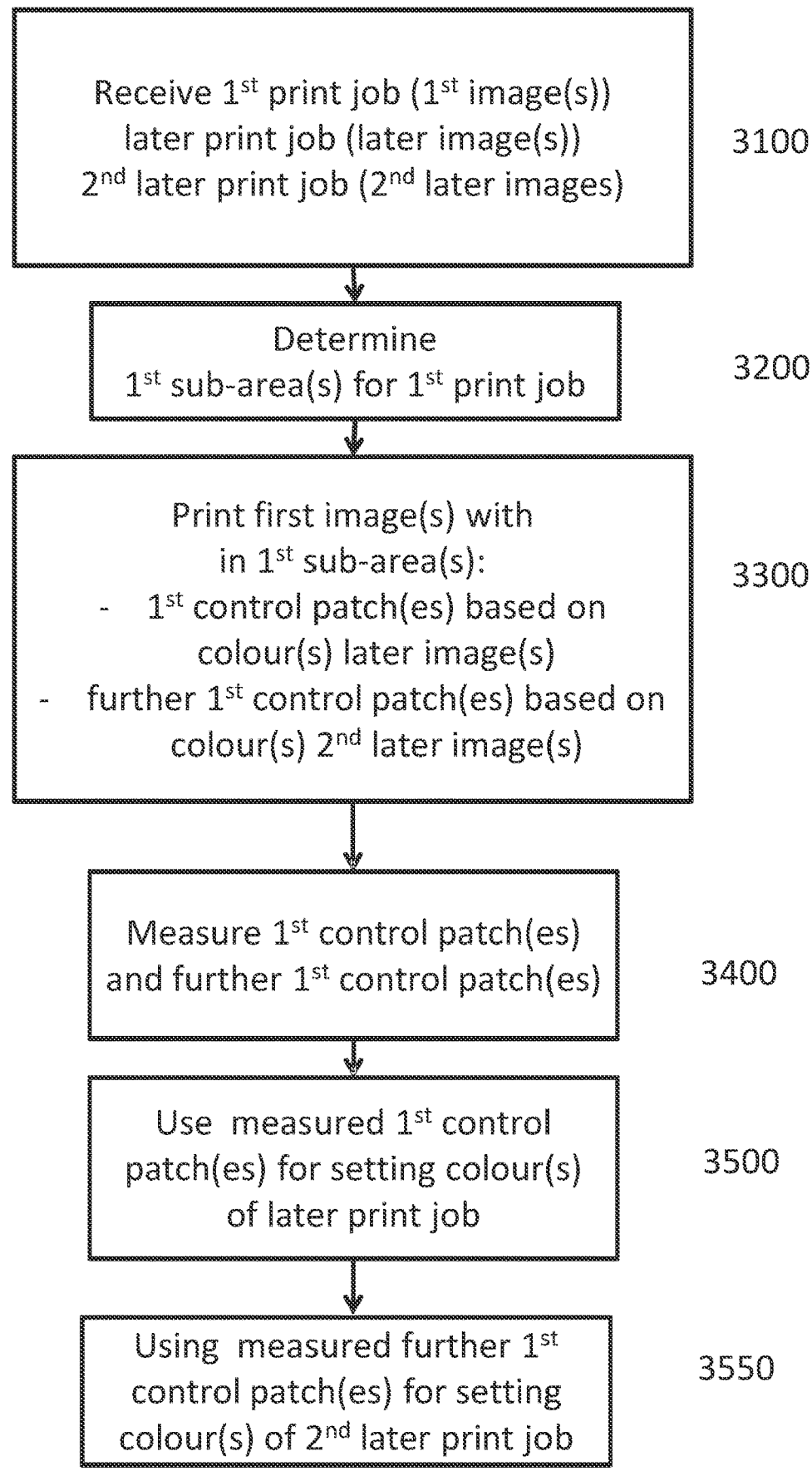

FIG. 10 illustrates another exemplary embodiment of a digital printing method comprising the steps 3100-3550. In a first step 3100, a first print job, a later print job, and a second later print job are received. The first print job contains first image data of one or more first images to be printed in a printable area. The later print job contains later image data of one or more later images associated with at least one colour and/or at least one density level. The second later print job is to be printed after the later print job, and the second later print job contains second later image data associated with at least one colour and/or at least one density level.

In a second step 3200, at least one first sub-area of the printable area where no image of said one or more first images is to be printed, is determined, using the first image data.

In a third step 3300, the one or more first images are printed in the printable area and at least one first control patch is printed in the determined at least one first sub-area, using for said at least one first control patch at least one colour and/or at least one density level representative for the at least one colour and/or the at least one density level associated with the later image data. Further, at least one further first control patch is printed in the determined at least one first sub-area, using for said at least one further first control patch at least one colour and/or at least one density level representative for the at least one colour and/or the at least one density level associated with the second later image data.

In a fourth step 3400, the colour and/or density level of the printed at least one first and further first control patches is measured.

In a fifth step 3500, the measured colour and/or density level of the at least one first control patch is used for controlling the later print job. In a sixth step 3550, the measured colour and/or density level of the at least one further first control patch is used for controlling the second later print job.

According this embodiment of FIG. 10 control patches for two later print jobs are included in the same first print job. This may be useful when the first later print job is not suitable for printing sufficient control patches for the second later print job.

The skilled person understands that the method of FIGS. 8 and/or 9 and/or 10 may be combined, and that the method may be further optimised for obtaining a high degree of accuracy depending on the type and length of print jobs that are typically received.

In the embodiments of FIGS. 7-10, using the measured colour and density level for controlling the later print job may comprise determining at least one correction value for the at least colour and/or density level associated with the later print job; and performing the later print job based on said at least one correction value.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the figures, including any functional blocks labelled "modules", may be provided through the use of dedicated hardware as well as hardware capable of executing software in association with appropriate software. Moreover, explicit use of the term "processing module" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, and the like represent various processes which may be substantially represented in computer readable medium and so executed by a computer or processor, whether or not such computer or processor is explicitly shown.

Whilst the principles of the invention have been set out above in connection with specific embodiments, it is to be understood that this description is merely made by way of example and not as a limitation of the scope of protection which is determined by the appended claims.

The invention claimed is:

1. A digital printing method for digitally printing at least a first print job and a later print job to be executed after the first print job, said method comprising:
   receiving a first print job containing first image data of one or more first images to be printed in a printable area and a later print job containing later image data associated with at least one colour and/or at least one density level;
   determining at least one first sub-area of said printable area where no image of said one or more first images is to be printed, using the first image data;
   printing the one or more first images in the printable area and at least one first control patch in the determined at least one first sub-area, using for said at least one first control patch at least one colour and/or at least one density level representative for the at least one colour and/or the at least one density level associated with the later image data;
   measuring the colour and/or density level of the printed at least one first control patch; and
   using the measured colour and/or density level of the at least one first control patch for controlling the later print job.

2. The digital printing method according to claim 1, wherein the step of determining of at least one first sub-area comprises at least one of:
   interpreting the first image data of the first print job; and
   using indications associated with the first image data of the first print job to determine the at least one first sub-area.

3. The digital printing method according to claim 1, wherein the step of determining of at least one first sub-area comprises at least one of:

providing an operator with a user interface configured to allow a user to indicate the at least one first sub-area; and providing an operator with a user interface configured to suggest based on the first image data one or more suitable areas and allowing the user to indicate the at least one first sub-area by modifying and/or confirming the one or more suggested areas.

4. The digital printing method according to claim 1, further comprising:

determining at least one further first sub-area of said first printable area where no image of the one or more first images is to be printed, using the first image data, said at least one further first sub-area being located downstream of the at least one first sub-area;

printing at least one further first control patch in the determined at least one further first sub-area, using for said at least one further first control patch at least one colour and/or at least one density level based on the measured colour and/or density level of the at least one first control patch; while not affecting the colour and/or density level used for printing of the first image data;

measuring the colour and/or density level of the at least one further first control patch;

wherein the steps above may be repeated a number of times; and using the measured colour and/or density level of the at least one further first control patch for controlling the later print job.

5. The digital printing method according to claim 1, further comprising:

receiving a second print job to be printed between the first and the later print job, said second print job containing second image data of one or more second images to be printed in a second printable area;

determining at least one second sub-area of said second printable area where no image of the one or more second images is to be printed, using the second image data;

printing the one or more second images in the second printable area and at least one second control patch in the determined at least one second sub-area, using for said at least one second control patch at least one colour and/or at least one density level based on the measured colour and/or density level of the at least one first control patch;

measuring the colour and/or density level of the at least one printed second control patch; and using the measured colour and/or density level of the at least one second control patch for controlling the later print job.

6. The digital printing method according to claim 1, further comprising:

receiving a second later print job to be printed after the later print job, said second later print job containing second later image data associated with at least one colour and/or at least one density level; wherein the step of printing the one or more first images in the printable area comprises also printing at least one further first control patch in the determined at least one first sub-area, using for said at least one further first control patch at least one colour and/or at least one density level representative for the at least one colour and/or the at least one density level associated with the second later image data;

measuring the colour and/or density level of the printed at least one further first control patch; and using the measured colour and/or density level of the at least one further first control patch for controlling the second later print job.

7. The digital printing method according to claim 1, wherein using the measured colour and density level of the at least one first control patch for controlling the later print job comprises determining at least one correction value for the at least colour and/or density level associated with the later print job; and performing the later print job based on said at least one correction value.

8. The digital printing method according to claim 1, wherein the printing comprises Raster Image Processing (RIP) of the first image data and screening of the processed first image data for generating first print data.

9. The digital printing method according to claim 1, wherein the printing comprises the merging of the first image data with image data for the at least one first control patch.

10. The digital printing method according to claim 9, wherein the printing comprises Raster Image Processing (RIP) of the first image data and screening of the processed first image data for generating first print data; and wherein the merging is performed:
after the raster image processing, preferably between the raster image processing and the screening; or;
during rendering of the first image data during the raster image processing; or
prior to the raster image processing.

11. The digital printing method according to claim 1, wherein the step of printing at least one first control patch comprises printing a plurality of first control patches using a plurality of different colours and/or density levels representative for each of the at least one colour and/or the at least one density level associated with the later image data.

12. The digital printing method according to claim 1, wherein the step of printing at least one first control patch comprises printing a control patch using a target colour and/or density level associated with the later image data, and at least two control patches in different colours close to the target colour.

13. A digital printing system for digitally printing at least a first print job and a later print job to be executed after the first print job, said digital printing system comprising:

an image processing module configured to receive a first print job containing first image data of one or more first images to be printed in a printable area and a later print job containing later image data associated with at least one colour and/or at least one density level; and to determine at least one first sub-area of said printable area where no image of said one or more first images is to be printed, using the first image data;

a printing device configured to print the one or more first images in the printable area and at least one first control patch in the determined at least one first sub-area, wherein the image processing module is configured to control the printing device such that for said at least one first control patch at least one colour and/or at least one density level representative for the at least one colour and/or the at least one density level associated with the later image data, is used; and a measurement device configured to measure the colour and/or density level of the printed at least one first control patch;

wherein the image processing module is configured to use the measured colour and/or density level of the at least one first control patch for controlling the later print job.

14. The digital printing system according to claim 13, wherein the image processing module comprises a patch area determination module configured to perform at least one of:
- interpreting the first image data of the first print job;
- using indications, such as cutting lines or crosses, associated with the first image data of the first print job;
- providing an operator with a user interface configured to allow a user to indicate the at least one first sub-area; and
- providing an operator with a user interface configured to suggest based on the first image data one or more suitable areas and allowing the user to indicate the at least one first sub-area by modifying and/or confirming the one or more suggested areas.

15. The digital printing system according to claim 13, wherein the image processing module is further configured to determine at least one further first sub-area of said first printable area where no image of the one or more first images is to be printed, using the first image data, said at least one further first sub-area being located downstream of the at least one first sub-area;
- wherein the image processing module is further configured to control the printing device such that at least one further first control patch is printed in the determined at least one further first sub-area, using for said at least one further first control patch at least one colour and/or at least one density level based on the measured colour and/or density level of the at least one first control patch; while not affecting the colour and/or density level used for printing of the first image data;
- wherein the measurement device is further configured to measure the colour and/or density level of the at least one further first control patch; and
- wherein the image processing module is configured to use the measured colour and/or density level of the at least one further first control patch for controlling the later print job.

16. The digital printing system according to claim 13, wherein the image processing module comprises a Raster Image Processing (RIP) module and a screening module configured for generating first print data based on the first image data and later print data based on the later image data.

17. The digital printing system according to claim 13, wherein the image processing module is configured for merging of the first image data with the at least one first control patch in order to generate first print data for printing the one or more first images and the at least one first control patch.

18. The digital printing system according to claim 13, wherein the image processing module comprises a colour mapping module configured to determine a colour and/or density level for the later print job based on the measured colour and/or density level.

19. The digital printing system according to claim 17, wherein the RIP module is configured to generate processed first image data and processed later image data based on the received first image data and the received later image data, wherein the image processing module comprises an image merging module configured to use the processed first image data, at least one colour and/or at least one density level representative for the at least one colour and/or the at least one density level associated with the later image data, and the determined at least one first sub-area to generate modified processed first image data comprising the at least one first control patch; and wherein the screening module is configured to screen the modified processed first image data.

20. The digital printing system according to claim 19, wherein the image merging module is configured to use the processed first image data, the measured colour and/or density level of the at least one first control patch, and the determined at least one further first sub-area to generate modified processed first image data comprising the at least one further first control patch; and wherein the screening module is configured to screen the modified processed first image data.

* * * * *